United States Patent [19]

Charnock

[11] 4,167,643

[45] Sep. 11, 1979

[54] ELECTRODE JOINTS

[75] Inventor: John A. Charnock, Toronto, Canada

[73] Assignee: ERCO Industries Limited, Islington, Canada

[21] Appl. No.: 894,718

[22] Filed: Apr. 10, 1978

[30] Foreign Application Priority Data

Apr. 12, 1977 [GB] United Kingdom ............... 14991/77

[51] Int. Cl.² ............................................. H05B 7/14
[52] U.S. Cl. .................................................... 13/18 C
[58] Field of Search ............... 13/18; 403/306, DIG. 5

[56] References Cited

U.S. PATENT DOCUMENTS

| | | | |
|---|---|---|---|
| 3,016,343 | 1/1962 | Krenzke | 13/18 C |
| 3,646,240 | 2/1972 | Lewis | 403/DIG. 5 |

Primary Examiner—R. N. Envall, Jr.
Attorney, Agent, or Firm—Sim & McBurney

[57] ABSTRACT

In joining together electrode segments through nipples for use in electric furnaces, certain designated threads adjacent the interface of the segments are inactivated so that only those threads tending to self-tighten with increasing temperature are active. In this way, any tendency for the joint to loosen upon heating is avoided and all the stress is borne by self-tightening threads.

4 Claims, 2 Drawing Figures

ELECTRODE JOINTS

FIELD OF INVENTION

The present invention relates to electrode joints.

BACKGROUND OF THE INVENTION

Carbon electrodes used in electric furnaces, such as in the electrothermal production of phosphorus, are consumed in use. A substantially continuous operation of furnace usually is required for economic product production and hence means for continually feeding the electrodes into the furnace without interruptions is necessary. This typically has been achieved by fabricating electrode segments with suitable threaded sockets at both ends, so that a plurality of electrode segments can be connected to each other under tension through a cylindrical threaded connector, known as a nipple. In this way, a new electrode segment may be joined to an electrode segment being consumed through the nipple allowing for a continuous feed operation.

When such an electrode joint has been employed it has been found that stresses concentrated at the flank portion of the threads nearest the abutting end faces of the electrode segments often cause loosening of the joint with consequently-increased electrical resistance at the joint and hence increased furnace power requirements. In some cases, the stresses may be so severe as to cause splitting or cracking of the electrode sections.

Loosening of the joints in this way necessitates post torquing of the joints from time to time to retighten the same with attendant labor costs and lost production time, which may abount to as much as 2 hours per week for each electrode or about 3 ½ percent of the total operating time.

The stresses arise largely from thermal expansion stresses brought about by the differences in thermal expansion coefficient of the materials of construction of the electrode segments and the nipple. Thus, the electrode segments usually are made of carbon while the nipples usually are made of graphite, the latter material having about half the thermal expansion coefficient of the carbon.

SUMMARY OF THE INVENTION

The present invention provides a novel joint wherein tension is applied between the electrode segments and the nipple during assembly and which is not subjected to loosening or other effects of thermal expansion by the inactivation of certain threads adjacent the abutting end faces of the electrode segments.

GENERAL DESCRIPTION OF DRAWINGS

Since the relationship of expansion to temperature is linear, the differential expansion of the elements of the joint about a neutral point may be considered to apply to the carbon electrode segments with zero expansion applied to the nipple. As the electrodes and the nipple are symmetrical about the plane of the joint, i.e., the interface between the abutting electrode segments, and have a common longitudinal axis, the neutral point may be considered as the centre of the nipple at the interfacial plane. Expansion of the electrode segments relative to the nipple tends to be directly away from this point in all directions.

Additionally, the stress in the nipple is not evenly distributed over the complete length of thread engagement but rather is concentrated over the first few threads.

The difference in thermal expansion of the materials causes the angle of the direction of expansion of the electrode segments with respect to the planar interface to increase with increasing axial distance from the planar interface, and does not exceed the pitch angle of the screw threads until some threads distance from the interface. The tendency, therefore, is for the joint to loosen in the zone where the the greatest stress occurs while the joint is tightened in the zone of low stress.

In the present invention, the joint is constructed so that the threads immediately adjacent the interfacial plane are inactive. The number of inactive threads is carefully controlled so that those threads tending to loosen with increasing temperature are inactive while those tending to self-tighten with increasing temperature are active. The determination of the number of threads required to be inactive is a simple calculation for any given system, as will become more apparent from the description below.

By providing the joint in this way, the greatest stress is concentrated in a zone having a tendency to tighten with increasing temperature, so that the tendency of the joint to loosen is eliminated.

The inactivation of the threads preferably is achieved by providing a zone of the nipple having no surface threads or may be achieved by increasing the diameter of the recesses in the inactive region, removing threads from the bore in the inactive region, or by a combination of these procedures.

Figure 1:
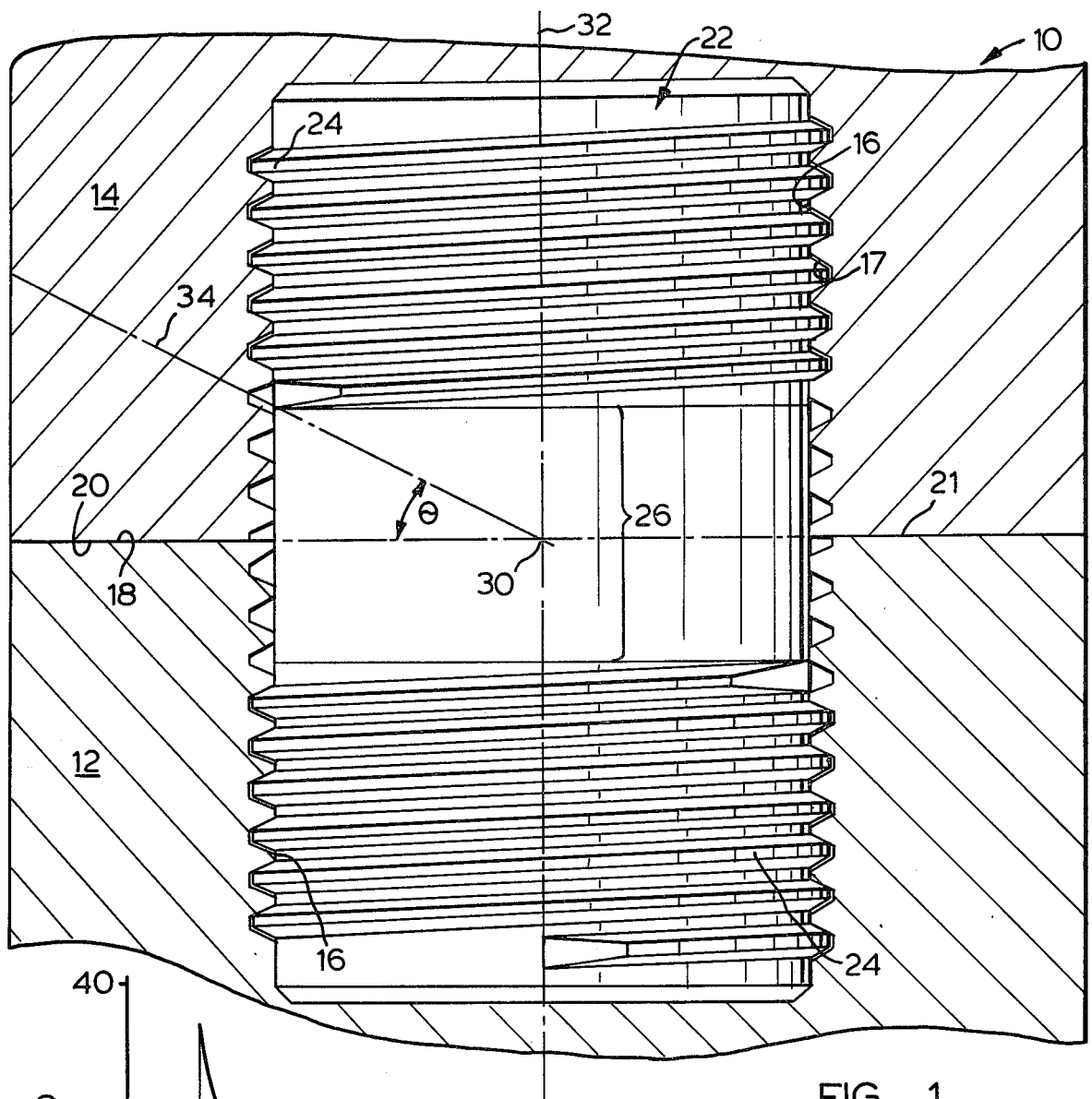
FIG. 1 is a part sectional view of part of a joint between two electrode segments constructed in accordance with one embodiment of the invention.

Referring first to FIG. 1, an electrode joint 10 constructed in accordance with this invention comprises a lower generally cylindrical carbon electrode segment 12 and an upper generally cylindrical carbon electrode segment 14. The electrode segments 12 and 14 each has an axially-directed threaded bore 16 with the threads 17 in each bore 16 having the same pitch. The electrode segments 12 and 14 have planar end faces 18 and 20 respectively which abut to define a plane of join 21 of the electrode segments.

A cylindrical threaded graphite nipple 22 is threadedly received in the bores 16, the length thereof being received approximately half in each bore 16. The threads 24 of the nipple 22 are engaged in interfacial contact with the threads 17 in the bores 16, the interfacial contact occurring on the adjacent faces closer to the plane of join 21. Interfacial engagement on those faces results from maintaining tension between the electrode segment 12 or 14 and the nipple 22 during assembly of the nipple 22 with the appropriate electrode segment 12 or 14.

The nipple 22 includes an axial, smooth-surfaced zone 26 from which the threads 24 have been removed or are omitted initially, rendering the corresponding bore threads 17 inactive. The axial length of the zone 26 is dependent on a number of factors, as is apparent from the following discussion.

The neutral point 30 of the joint 10 with respect to thermal expansion is the point of the intersection of the axis 32 of the cylindrical nipple 22 and the cylindrical electrode segments 12 and 14 and the interfacial plane 21. As the axial distance from the plane 21 in either direction increases, the net direction of thermal expansion of the higher coefficient of thermal expansion electrode segments 12 and 14 with respect to the lower coefficient of thermal expansion nipple 22 increases in angle from the neutral point with respect to the interfacial plane 21, until the net direction of thermal expansion as indicated by line 34 subtends an angle θ to the plane 21 which is the same as and then exceeds the thread pitch of the engaging threads 17 and 24.

In accordance with this invention, no threads are provided on the surface of the nipple 22 between the plane 21 and at least the location at which the direction of net expansion of the joint is the same as the thread pitch. Usually, the unthreaded region extends just to that location, since no additional benefit is to be derived by extending the same further, although it is possible to provide the inactive region extending into the area where the net direction of thermal expansion exceeds the pitch angle.

The non-threaded area required for any particular joint can readily be determined, since the thread pitch will be known and the dimensions of the electrode segments and the nipple also will be known. One simple manner of determining the inactive zone 26 is to consider imaginary cones on each side of the plane 21, each having its vertex at the neutral point 30, its axis coaxial with the axis 32 and a surface slope of the same angle as the thread pitch, then the threads 17 or 24 to be rendered inactive are those lying outside the cones.

The inactivation of threads adjacent the plane 21 may be achieved by any other convenient manner, such as, by removing the threads 17 in the appropriate region.

Figure 2:
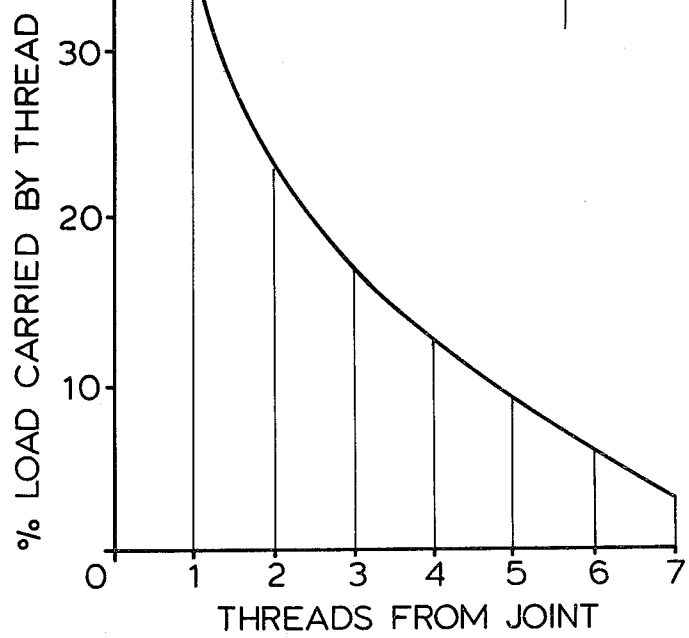
FIG. 2 is a graphical representation of the variation of load carried by a thread of a joint with distance from the plane of interface of the electrode segments.

By constructing the joint 10 in this way, the threads 17 and 24 which are in engagement tend to tighten upon an increase in temperature, since the direction of net thermal expansion exceeds the pitch of the engaging thread surfaces. Thus, the greatest mechanical stress, as shown by FIG. 2, is experienced by self-tightening threads, so that any tendency for the joints to loosen with increasing temperature, as in the case when thread inactivation is not practiced, is eliminated.

Since the tendency for the joint 10 to loosen with thermal expansion is eliminated, the problems of overheating of the joints and possible electrode breakage, and post-torquing to retighten the joints with the attendant labor costs and lost production time are eliminated.

EXAMPLE

A phosphorus furnace was operated continuously using three electrodes made up of carbon cylindrical segments varying in length from about 90 to about 114 inches by 55 inches in diameter having threaded sockets in both ends. Dimensions of the sockets were as follows:

| | | |
|---|---|---|
| Thread pitch 2" | | |
| Depth of socket 21.125" | + 0.125" | |
| | − 0.000 | |
| internal diameter of socket | | |
| maximum, i.e., root of thread | 26.630 | + 0.0625 inches |
| | | − 0.0000 |
| maximum, i.e., tip of thread | 24.630 | + 0.0625 inches |
| | | − 0.0000 |

The electrode segments were connected under tension using conventional threaded graphite nipples. Dimensions of the conventional nipples were as follows:

| | | |
|---|---|---|
| Length | 41.568 | + 0.000 inches |
| | | − 0.125 |
| Diameter to thread tips | 26.5000 | + 0.0000 inches |
| | | − 0.0625 |
| Diameter to thread roots | 24.5000 | + 0.0000 inches |
| | | − 0.0625 |

The thread commenced 1.375 inches from the top and bottom of the nipple respectively.

The use of the conventional nipples was discontinued in one electrode and the conventional nipples were progressively replaced by experimental nipples designed in accordance with the present invention as illustrated in FIG. 1.

Dimensions of the experimental nipples were the same as for the conventional nipples with the following exceptions. The total length over which the threads were removed from the length of the electrode was 11.25 inches. The distance from the top to start of cutting away of threads is 15.159 inches. The diameter of the section over which the threads were removed was 24.25 inches, i.e., 0.25 inches undercut from diameter of the conventional nipple between the thread roots. As soon as all of the conventional nipples had been replaced by the experimental nipples, joint loosening problems experienced with the conventional nipples in the one electrode disappeared but continued to be experienced in the two remaining electrodes.

After about six months operation in this manner the nipples on a second electrode were similarly replaced by the experimental nipples with similar results, but joint loosening problems continued on the third electrode. About 5 months later the nipples in the third electrode were similarly replaced by the experimental nipples and as was the case with the two previous electrodes problems from joint loosening also disappeared.

SUMMARY

The present invention, therefore, is directed to a novel electrode joint which does not exhibit joint loosening tendencies. Modifications are possible within the scope of the invention.

What I claim is:
1. An electrode joint comprising:
   a first generally cylindrical electrode segment having a planar end face and a generally axial threaded bore in said end face,
   a second generally cylindrical electrode segment having a planar end face and a generally axial threaded bore in said end face wherein the threads have the same pitch as those in said first axial bore,
   said first and second electrode segments being arranged in end face-abutting relationship to define an interfacial plane,
   a cylindrical threaded nipple threadedly engaged in said bore in both said first and second electrode segments to maintain said segments in said face-abutting relationship, and constructed of a material of a lesser coefficient of thermal expansion than the material of said electrode segments, the threads in each said bore and the threads of said nipple being in engagement on the adjacent flank portions thereof closest to said interfacial plane, the point of intersection of the axis of said nipple and electrode segments and said interfacial plane constituting a neutral point for thermal expansion of said joint, for each said bore at least the threads located between said interfacial plane and the thread whose net direction of thermal expansion from the neutral point is at an angle at least equal to the thread pitch are inactivated, whereby the threads are self-tightening with increasing temperature in the portion of each said bore wherein said threads are active.

2. The electrode joint of claim 1 wherein said nipple has two spaced apart threaded portions corresponding to said active threads and separated by a smooth-surfaced unthreaded portion corresponding to said inactive threads.

3. The threaded joint of claim 2 wherein said threaded portions commence with the thread whose net direction of thermal expansion from the neutral point is equal to the thread pitch.

4. The electrode joint of claim 1 wherein said electrodes are constructed of carbon and said nipple is constructed of graphite.

* * * * *